United States Patent
Sacks et al.

[19]

[11] Patent Number: 6,131,977
[45] Date of Patent: Oct. 17, 2000

[54] TONGS ASSEMBLY

[76] Inventors: Steven M. Sacks, 3925 Crow Rd., #58, Beaumont, Tex. 77706; Glen M. Kertz, 3484 Pheasant, Orange, Tex. 77630

[21] Appl. No.: 09/241,701

[22] Filed: Feb. 2, 1999

Related U.S. Application Data

[60] Provisional application No. 60/073,758, Feb. 5, 1998.

[51] Int. Cl.[7] .............................. A47G 21/10; A47J 43/28
[52] U.S. Cl. ........................... 294/99.2; 294/25; 294/131
[58] Field of Search ............................. 294/3, 5, 8.5, 11, 294/16, 25, 27.1, 28, 33, 99.2, 106, 131; 30/142, 150, 323, 326; D7/683–686

[56] References Cited

U.S. PATENT DOCUMENTS

| | | | |
|---|---|---|---|
| D. 350,050 | 8/1994 | Klunder | D7/686 |
| 1,846,308 | 2/1932 | Buzzell | 294/33 |
| 2,396,334 | 3/1946 | Miller | 294/131 X |
| 2,397,823 | 4/1946 | Walter | 294/131 X |
| 2,747,912 | 5/1956 | Franklin | 294/29 |
| 4,093,297 | 6/1978 | Reiber | 294/131 X |
| 4,227,760 | 10/1980 | Alexander et al. | 294/99.2 |
| 4,261,608 | 4/1981 | Bradshaw | 294/25 |
| 4,768,288 | 9/1988 | Culbertson | 30/142 |
| 4,905,870 | 3/1990 | Mamolou | 294/99.2 X |

FOREIGN PATENT DOCUMENTS

| | | | |
|---|---|---|---|
| 542016 | 1/1932 | Germany | 294/99.2 |
| 12701 | 7/1993 | WIPO | 294/99.2 |

*Primary Examiner*—Johnny D. Cherry
*Attorney, Agent, or Firm*—Conley, Rose & Tayon

[57] ABSTRACT

A tongs assembly comprising a tongs and a hand shield is disclosed. In a preferred embodiment, the tongs include a pair of arms hingedly connected at one end and the shield is attached to the arms and extends radially outward from an optimal fulcrum point on the arms. The shield is preferably round and formed by two thin, rigid shield sections that are individually attached to the arms. Each shield section is positioned on an arm in such a way as to create a fulcrum point on the longitudinal axis of the tongs, so that in the open position, the grasping ends of the tongs pivot downwardly and the hinged or closed end of the tongs pivot upwardly and away from the surface on which the grasping ends of the tongs are resting. The handles of the tongs are thereby kept from directly contacting the food or the utensil.

23 Claims, 5 Drawing Sheets

TONGS ASSEMBLY

CROSS-REFERENCE TO RELATED APPLICATIONS

This application claims the benefit of U.S. Provisional Patent Application Ser. No. 60/073,758 filed Feb. 5, 1998.

STATEMENT REGARDING FEDERALLY SPONSORED RESEARCH OR DEVELOPMENT

Not Applicable

BACKGROUND OF THE INVENTION

The present invention generally relates to implements for handing food, and particularly to tong-type utensils having means for keeping the tong handles from coming, into direst contact with the food.

There are many kinds of food serving tongs in present day use. Among the most familiar are the simple sheet metal tongs composed of two identical opposing arms joined at one end by a pin and biased in the open position by a spring metal member inside the handles. Other well known tongs include the scissors type or those that are molded as one continuous piece of resilient plastic. Serving tongs such as these are often used at salad bars in restaurants and in serving other types of food in self-service food establishments, as well as for serving food in the home.

One common problem with most conventional tongs is that the handles very often come into direct contact with the food being served. For example, after serving themselves in a buffet serving line, some people place the tongs directly on top of the food or inside the serving bowl or utensil. Even when a user carefully props the tongs upright against the side of a salad bowl, or other serving bowl having curved interior walls, the tongs typically will fall or slide down into the bowl with the food. The next user must then retrieve the food-coated tong handles from the bowl, and in doing so usually soils his hands with the food material. Even if one takes care not to leave the serving tongs in the food container, the only other option in many circumstances is for the user to place the tongs on a table or counter top, where the handles are still subject to picking up contaminants from that surface, or a table cloth may be stained by food material clinging to the tongs. Another problem with most tongs is that sometimes the user's hand will accidentally slide too far down the arms of the tongs or will plunge into the food along with the grasping ends of the tongs, thereby placing the hand in direct contact with the food. At the very least, the prospect of eating food that has been "touched" by the hands of many previous tong-handlers is distasteful.

Beyond the aesthetic considerations, there are sanitary considerations. There is the distinct possibility that by sharing food that is served with conventional tong-type utensils, many human disease organisms including cold viruses, hepatitis viruses, *E. coli* or salmonella bacteria, or dysentery-causing parasites, for example, can be transmitted from one individual to another.

One approach toward isolating the hand of the user from the food being served is described by Culbertson in U.S. Pat. No. 4,768,288, which employs a U-shaped hand guard or places a separate hand grip on each arm of a pair of tongs.

Serving tongs that provide superior protection for both the food and the user from contamination and from soiling is needed. Such a utensil should be easy to manufacture and should not be cumbersome to use.

The present invention overcomes the deficiencies of the prior art.

BRIEF SUMMARY OF THE INVENTION

The tong assembly of the present invention generally includes tongs having a pair of arms, and a shield that extends substantially 360 degrees around the arms, when the tongs are closed, and projects radially outward a sufficient distance from the arms. The shield deters the user's hand from coming into direct contact with the material being grasped with the tongs. In preferred embodiments, the shield is optimally located at a fulcrum point on the arms. One end of each arm is joined at a pivot point to the corresponding end of the other arm in such a manner that the opposite or food grasping ends of the arms are mutually opposed when the tongs are closed, and are spaced apart from each other when the tongs are open. In some embodiments of the invention, the tongs of the assembly is similar to a conventional salad tongs.

The shield of certain embodiments is round and formed by two thin, rigid guard or shield sections that are attached to the arms. The two shield sections come together at their mutually opposable edges when the tong arms are squeezed closed by the user's grip on the handle portion of the arms.

The shield sections are situated on each arm in such a way as to create a fulcrum point on the longitudinal axis of the tongs, so that the normally open end of the tongs is always down and the hinged or closed end of the tongs is always held up and away from the surface on which the grasping end of the tongs and the edge of the shield are resting. This prevents the upper, or handle, end of the tongs from laying flat on any surface, and also prevents the handle portion of the tongs from coming into contact with the food. This protects the food from direct exposure to the portions of the tongs that are meant to be handled by the user.

Preferably, each shield section is semi-circular and together they form an essentially circular shield about the longitudinal axis of the tongs when the tongs are in the closed position, as shown in the accompanying drawings. The shield sections may have a shape other than semicircular, however, as long they are of sufficient width or radius and circumference to keep the handle end of the tongs from touching the food or surface, and as long as they adequately prevent the user's hands to contact the food. They may also be advantageously shaped to facilitate hanging or resting the tong assembly, such as on the rim of a salad bowl or to avoid rolling.

When the user grasps the handle portions and closes the tongs, the opposing ends of the two semi-circular shield sections come together to form an essentially closed circular shield that prevents the user's fingers from touching the food.

The tongs assembly may also include one or more shield support members, such as a bracket or brace, if necessary. Preferably, the tongs are metal and the guard sections are plastic; however, the tongs and shield sections may be made of the same material and formed as a continuous monolithic structure. In some embodiments, the shield sections are detachable from the tongs.

In certain embodiments the tongs assembly of the present invention includes a single shield, two resilient handle covers, and a resilient hinge end cover. Each handle cover is attached at one end to the hinge end cover, and the other end of one of the handle covers is attached to the shield member at a point that is adjacent the fulcrum point on the arms of the tongs. The handle covers, the hinge end cover and the shield are preferably made as a single monolithic structure from an elastomeric material. The handle covers may also include means for attachment to the arms of a tongs, such as a resilient rib or a rolled edge.

Also in accordance with the present invention, a separate shield, or handle guard, is provided that is suitable for attachment to a conventional set of tongs and is easily removable for cleaning and replacement. The detachable shield is preferably a single circular piece that is able to stably support the tong handles in a position that is elevated relative to the position of the grasping ends of the tongs when the tongs is placed on a surface. Alternatively, the shield may be divided into two mutually opposable semi-circular pieces. A preferred version of the detachable handle guard also includes a close-fitting cover for the tongs hinge end and a pair of covers for attachment to the tong handles. At least one of the handle covers is attached to the shield member and includes means for securing the assembly to the tong arms. In some embodiments, the hinge end cover, handle covers and shield member are formed from the same material monolithically, to provide a single structure.

Accordingly, it is an object of the present invention to provide a tongs assembly that overcomes the drawbacks of prior art food serving tongs and that is advantageous for use in the preparation, handling and serving of food or other objects where sanitary conditions should be maintained.

These and other objects, features and advantages of the present invention will become apparent with reference to the following description and drawing.

BRIEF DESCRIPTION OF THE SEVERAL VIEWS OF THE DRAWING

For a detailed description of a preferred embodiment of the invention, reference will now be made to the accompanying drawings wherein.

DETAILED DESCRIPTION OF THE PREFERRED EMBODIMENTS

The following examples are offered by way of illustration and are not intended to limit the scope of the invention in any manner.

Figure 1:
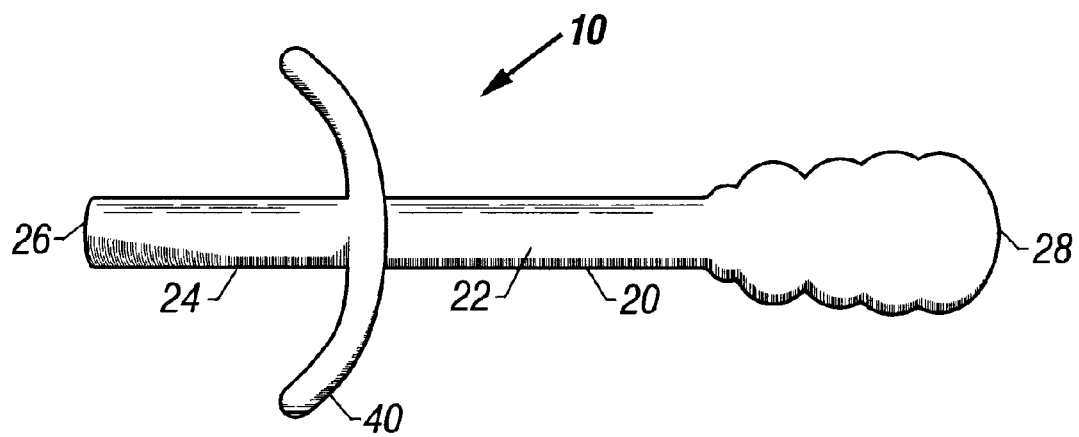
FIG. 1 is a side view of one embodiment of the tongs assembly of the present invention.
Figure 2:
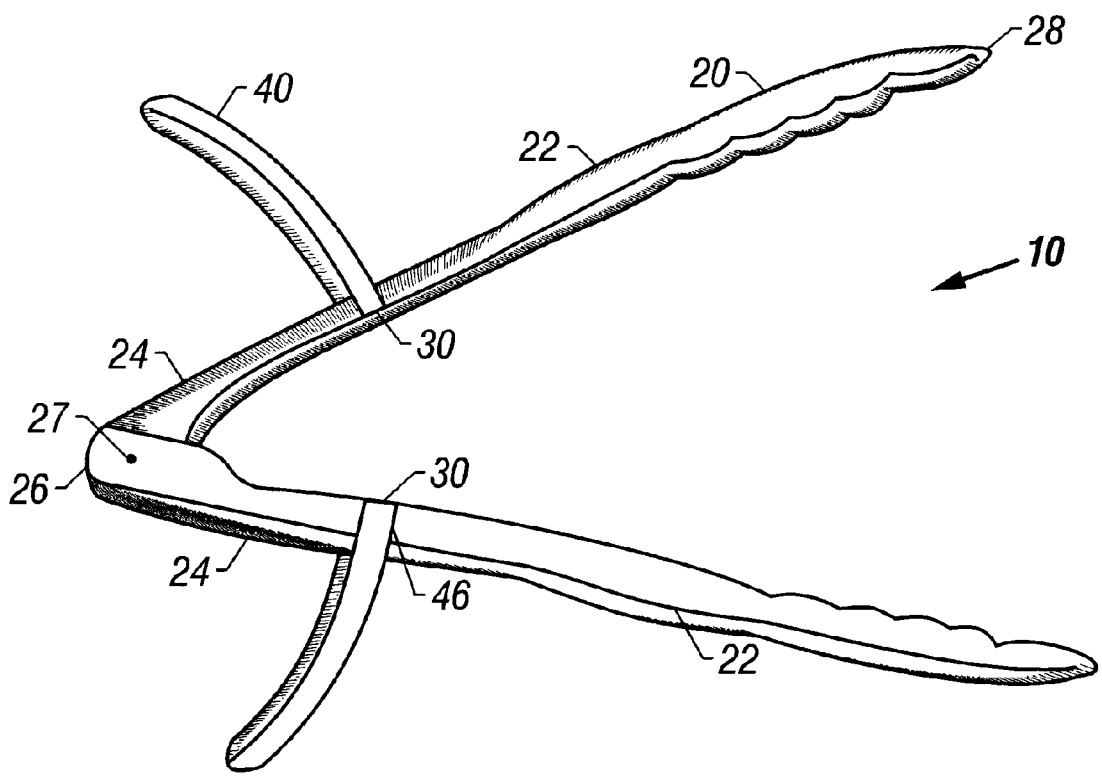
FIG. 2 is a perspective view, partially in cross section, of the tongs assembly shown in FIG. 1, showing the tongs in the open position.

Referring initially to FIGS. 1–4, an exemplary tong assembly 10 in accordance with the present invention is shown. Tong assembly 10 generally comprises tongs 20 and a protective guard or shield 40. Tongs 20 has two arms 22, each including hinge end 26 and grasping end 28, with a handle portion 24 disposed therebetween, as shown in FIGS. 1 and 2. Tongs 20 is preferably similar to a conventional metallic or plastic tongs with opposable grasping ends 28 and that is resiliently hinged or pivotable at the closed end 26 by means of pivot pin 27, or the like. Tongs 20 is spring-biased by a metal strip (not shown), or by another similar means, to maintain the grasping ends 28 or "jaws" in an initially open position, as shown in FIG. 2.

Figure 3:
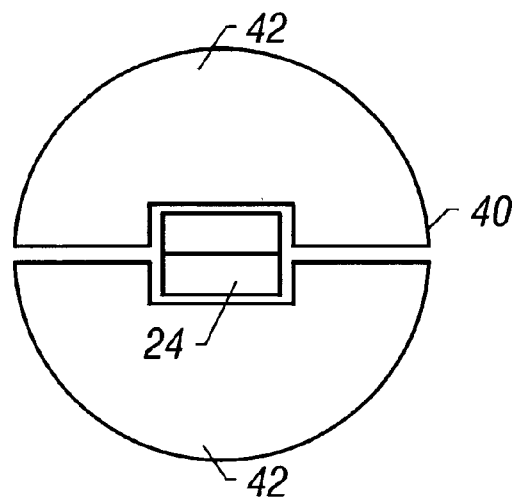
FIG. 3 is an end view of the tongs assembly of FIG. 1, viewed from the hinge end with the tongs in the closed position.
Figure 4:
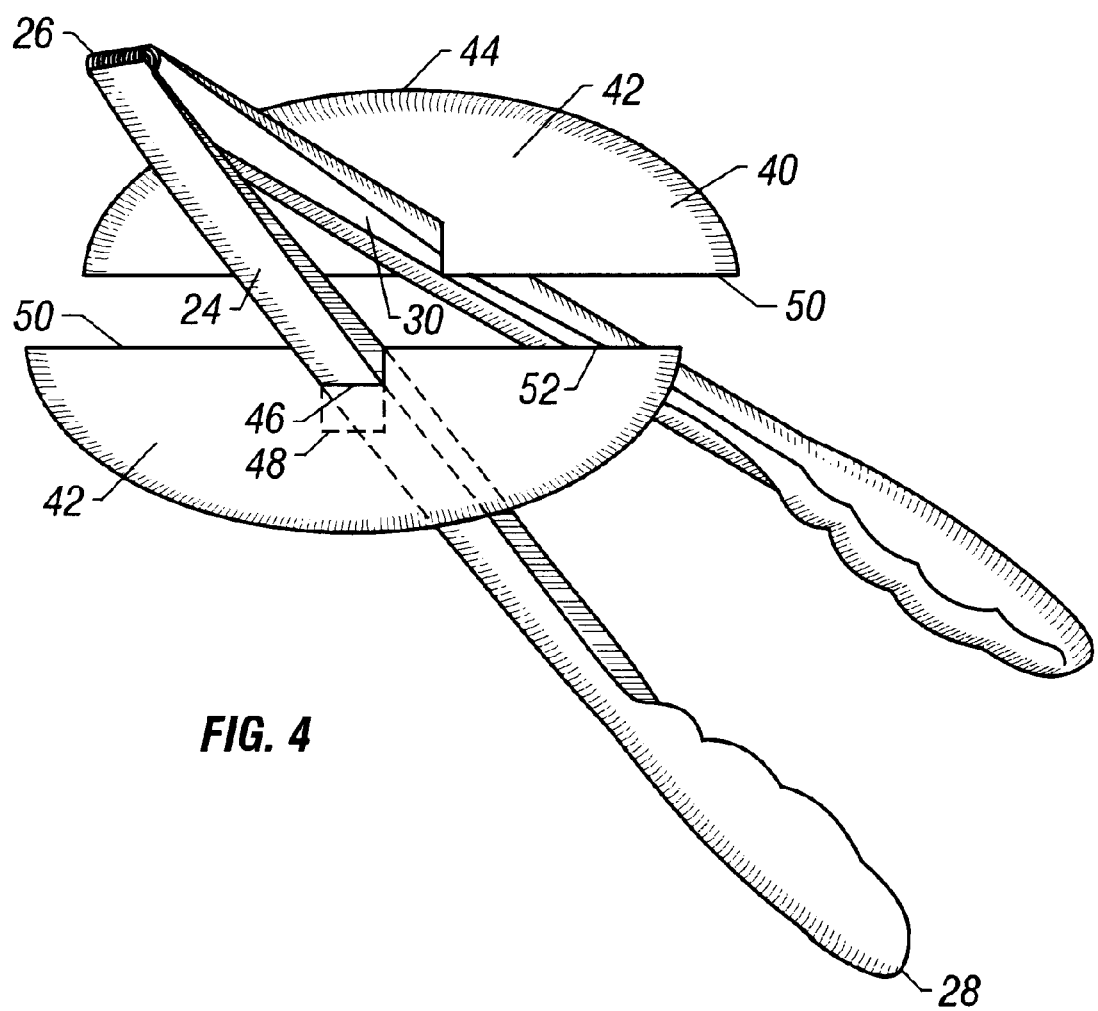
FIG. 4 is another perspective view of the tongs assembly of FIG. 1.

The handle portions 24 of arms 22 are attached at hinge end 26. A thin semi-circular guard or shield section 42 is disposed on each arm 22 adjacent fulcrum point 30 and extends outwardly from the longitudinal axis of arm 22, as shown in FIGS. 3 and 4. Shield section 42 is preferably monolithic with tongs 20, and may be additionally supported by a brace or bracket 48. Shield sections 42 extend radially from arms 22 more or less perpendicularly from the longitudinal axis of arms 22 so as to form a flat or slightly curved circular shield 40. Preferably the tongs 20 and shield 40 are made of stainless steel, but other suitably rigid materials may also be used.

Figure 6A:
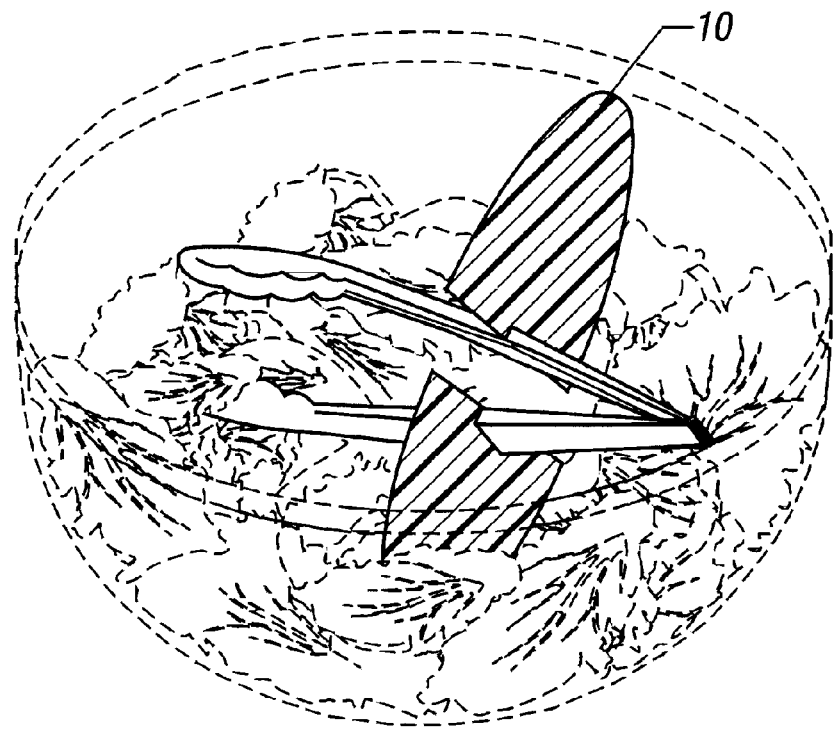
FIG. 6A shows a tongs assembly in accordance with the present invention being used with a bowl of food.
Figure 6B:
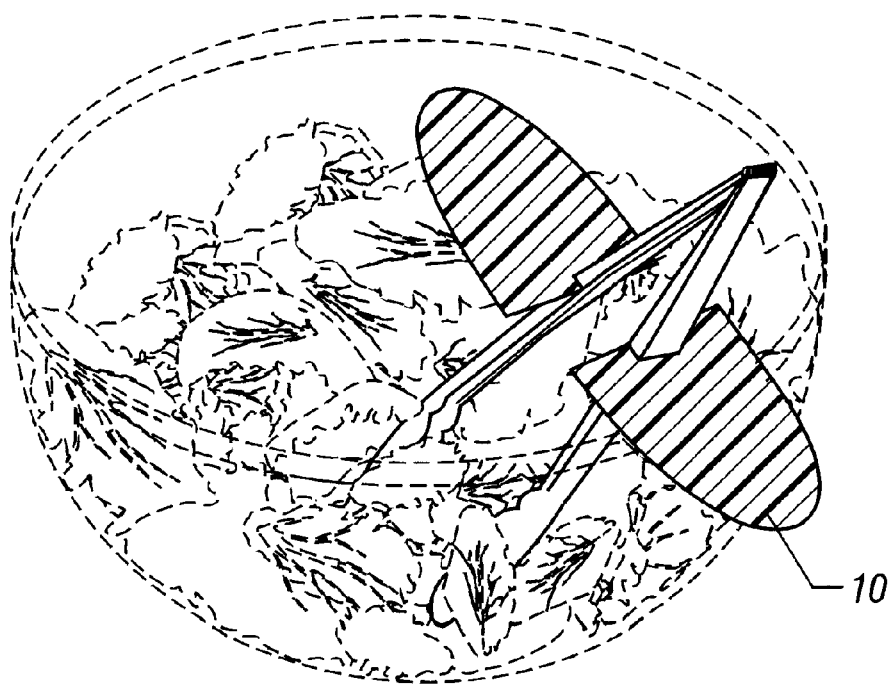
FIG. 6B is similar to FIG. 6A showing an alternative stable placement of the tongs assembly of the present invention in a bowl of food.

Each shield section 42 is attached by attachment point 46 to arm 22 at fulcrum point 30 on arm 22. The location of fulcrum point 30 along arm 22 is dictated by the relationship of the radius of shield 40, to the total length of the tongs 20 selected and the desired length that is allocated for the handle portion 24. For any combination of shield radius and tongs length, fulcrum point 30 is always chosen such that when handle attachment point 46 of shield section 42 is attached to arm 22, the outer edge 44 of shield 40 is able to lift and support handle portion 24 and hinge end 26 a sufficient distance above the plane of the tongs (lying in a horizontal position) to keep the handles 24 and end 26 out of contact with the food or out of contact with the surface upon which the tongs assembly 10 is resting, as illustrated in FIGS. 6A–B. The fulcrum point 30 causes the weight of that portion of the arms 22 extending from the fulcrum point 30 to the grasping ends 28 to be greater that the weight of that portion of the arms 22 extending from the fulcrum point 30 to the hinge ends 26. Thus, the tongs always pivot on the edge of the shield 40 toward the grasping ends 28, which lifts the hinge ends 26 away from the food or supporting surface of the utensil when the tongs are laid down by the user. The radius of shield 40 must be large enough to keep the user's hand from touching the food while the handles 24 are being gripped or from contacting the outer edges of the shield 40, yet must be small enough to avoid being cumbersome or obstructive to the user. To minimize visual obtrusiveness, the shield 40 is preferably made of a transparent plastic material. Shield 40 may also include decorative embellishments, advertising or other indicia.

When handles 24 of tongs 20 are squeezed together so that tongs 20 is in the closed position, arms 22 are mutually opposed, with the straight edges 50, 52 of shield sections 42 coming together. In this way, the two shield sections 42, together, form an essentially circular shield 40 about arms 22, as best shown in FIG. 3. If desired, shield sections 42, instead of being perpendicular to arms 22 and flat, may be cupped or curved, so as to form a concave upward (toward the hinge end 26) or concave downward (toward the grasping ends 28) shield 40. In some situations, it may be advantageous, to have the shield 40 in a bent or concave downward configuration to facilitate hanging the tongs assembly 10 on the side of a salad bowl, for example. Likewise, in other situations, it may be advantageous to have the concave upward configuration, in order for the shield 40 to also serve as a catch basin adjacent the user's hand, for example.

In an alternative embodiment, similar in appearance to that shown in FIG. 4, shield sections 42 of shield 40 are not monolithic with tongs 20, but instead are separate units from the tongs 20 and are securely attached to tongs 20 at the fulcrum point 30 on each arm 22 by welding, by matingly engaging a receiving slot (not shown) in arm 22, by heat fusion, glue or the like, or by using a combination of these methods. The tongs 20 and shield 40 may be formed from the same or different materials, preferably plastic or metal, depending on the way they will be used. The material chosen for shield 40 must be sufficiently rigid, however, to allow the outer edges of the shield 40 to support the weight of the tongs 20 in their at-rest position, or suitable reinforcement must be included to provide sufficient strength to the outer edges of the shield 40. Some users may find this embodiment advantageous over the tongs assembly shown in FIG. 4 for ease of manufacturing or other considerations.

The tong assembly shown in FIGS. 3 and 4 may also be varied by substituting a shield configuration that is other than round. For example, shield 40 may be oblong, square, rectangular or another regular or irregular shape which would also be satisfactory as long as the distance of the shield's outer edges from the arms 22 is sufficient to keep the handle portions 24 away from the food, and as long as the size and configuration of the shield 40 prevent the user's tong-gripping hand from directly contacting the food. One of these variations may be advantageous over that depicted in FIGS. 3 and 4 to discourage the rolling of the handle portions 24 of the tongs assembly 10 when it is resting on an uneven surface, or for considerations related to ease of manufacturing. Also, one variation or another might be preferred for advantageous placement of particular advertising indicia or the like.

Additional variations of the tong assembly 10 which are similar to that shown in FIGS. 1–4 have modified semi-circular, or other shaped shield members that are positioned somewhat offset from each other at the fulcrum point 30 on the tong arms 22 such that one shield section 42 overlaps the other slightly when the tongs 20 are closed. In this way a more completely closed circular shield 40 is formed about the tong arms 22.

Figure 5A:
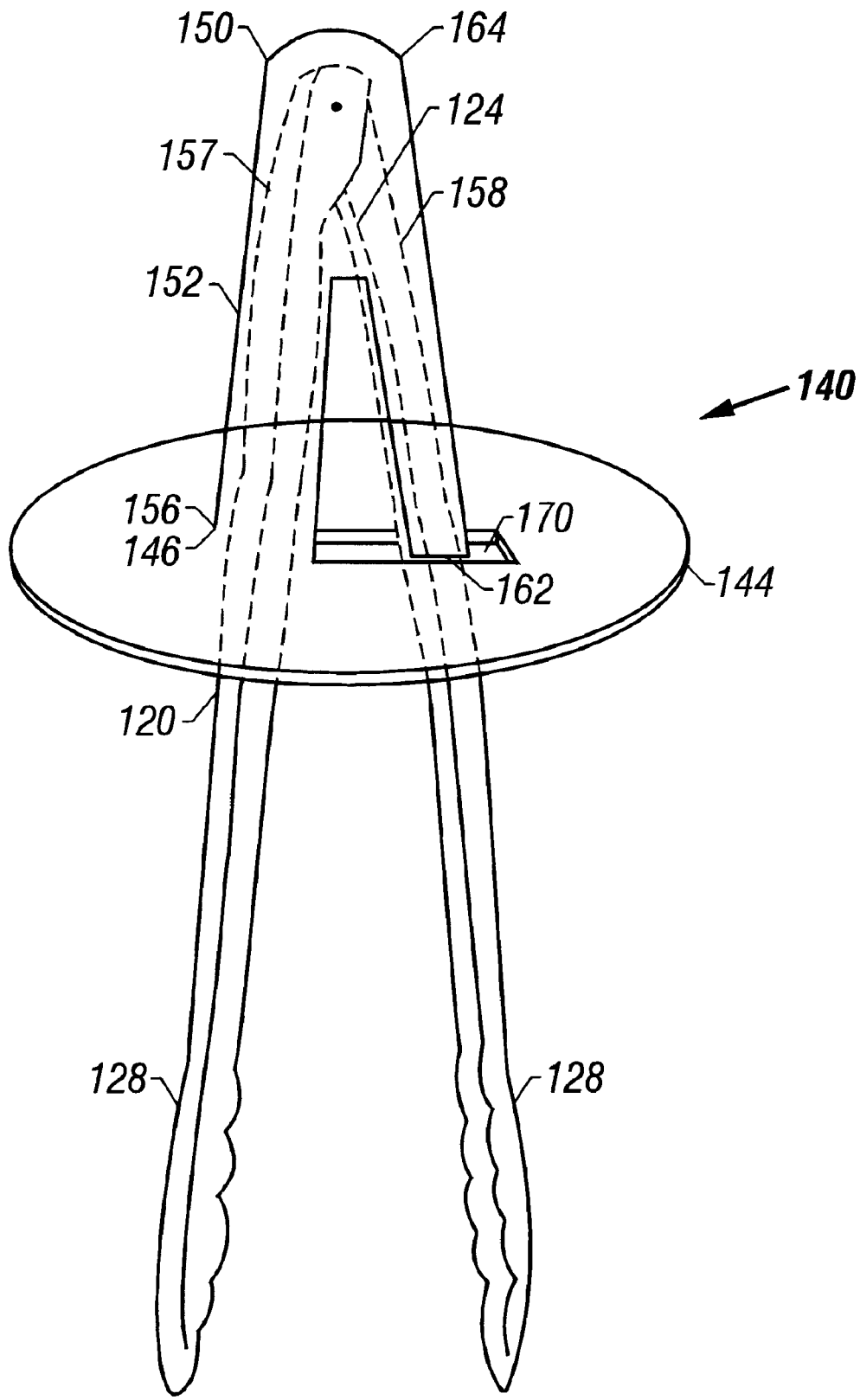
FIG. 5A is a perspective view of an alternative embodiment of the tongs assembly of the present invention.

Referring now to FIG. 5A, there is shown an alternative shield 140 in accordance with the present invention. The handle guard or shield 140 is suitable for attachment to and use with any of a variety of conventional, commercially available tongs 120. Unlike shield 40 of FIG. 4, shield 140 may be formed as a single piece instead of having two opposable guard members. In this embodiment, a hinge end cover 150, an attached handle cover 152 and an unattached handle cover 158 are connected to, or monolithic with shield 140. More particularly, the attached handle cover 152 is connected at end 157 to hinge cover 150 and at its other end 156 to shield 140. Unattached handle cover 158 is identical to attached handle cover 152 except it is connected only at end 164 to hinge cover 150, leaving end 162 not connected to shield 140. Hinge end cover 150 fits snuggly over the pivot or hinge end of a variety of conventional, commercially available tongs 120. Handle covers 152, 158 conform about and attach to the handle portion 124 of a pair of regular tongs 120, such as a conventional metal tongs having, crimped-edge or rolled-under arms (shown in phantom lines in FIG. 5B). Shield 140 also includes an aperture 170, located at the handle connection point 146 adjacent the tongs fulcrum point 130 (similar to fulcrum point 30). Aperture 170 is of suitable size and shape, for receiving the arms 122 of the tongs 120 and permits opening and closing of the tongs 120 within the aperture 170. End cover 150 and handle covers 152, 158 are made of a sufficiently resilient or elastomeric material to withstand repeated compression and release of the handle portion 124 of tong arm 122 by the user. Shield 140 must be sufficiently rigid to retain its shape and the position of aperture 170. The shield 140 is easily removed from the tongs 120 for washing and storage, and can be reattached prior to use.

Figure 5B:
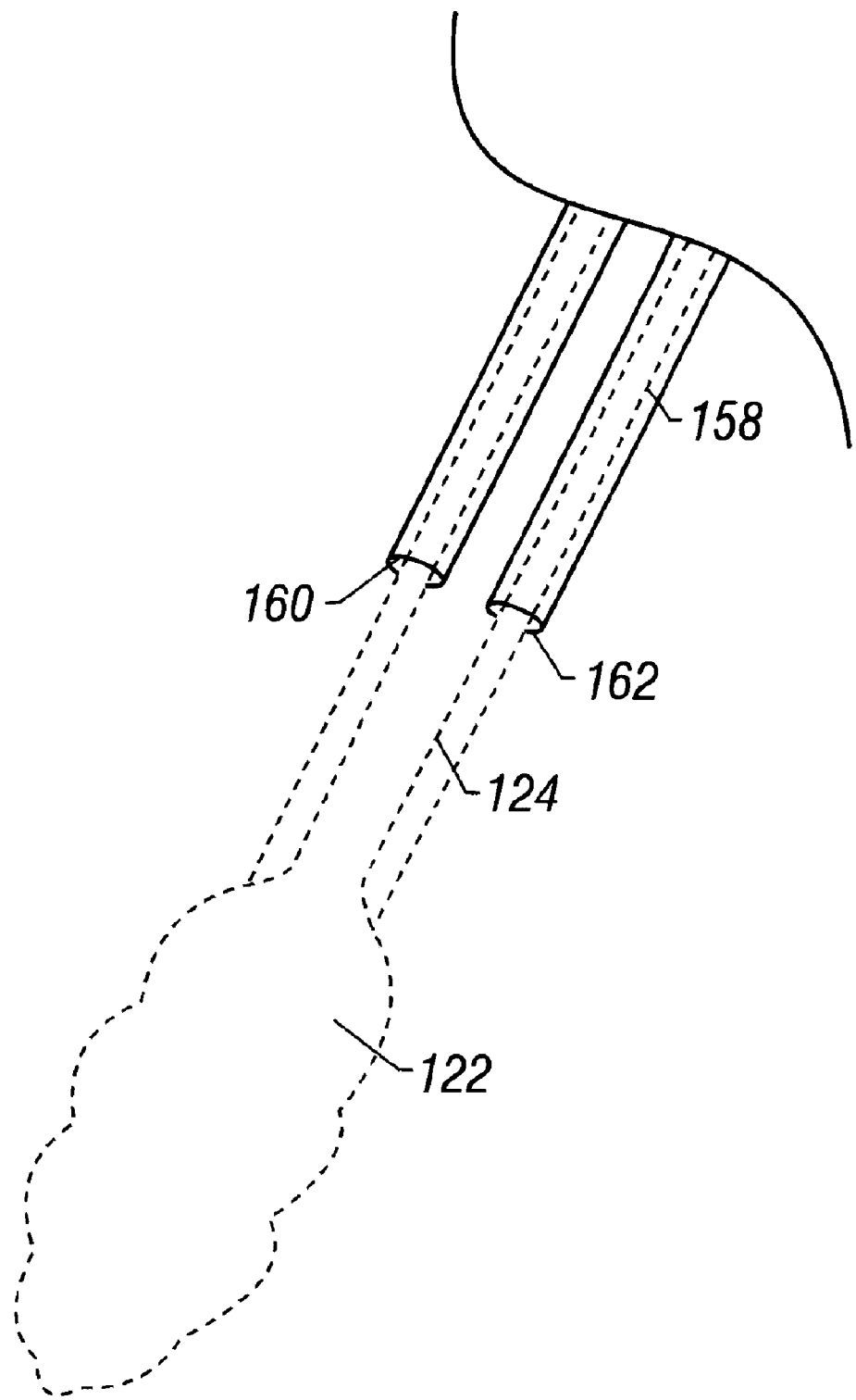
FIG. 5B is a perspective view of the underside of one of the arms of the tongs assembly shown in FIG. 5A.

FIG. 5B shows the underside of a tong arm 122 to which handle cover 158 is attached. Handle cover 158 has gripping edges 160 that are formed of a resilient material and that wrap around and engage the edges of the tong handle portions 124. Alternatively, the gripping edges 160 may have a resilient rib or raised edge (not shown) that can be pressed between the inwardly rolled edges of conventional metal tongs for cooperatively anchoring to the handles 124. Like handle cover 158, the handle cover 152 also has gripping edges (not shown), which are identical to gripping edges 160. Together, handle covers 152, 158 and hinge end cover 150 fit closely about and securely anchor the shield 140 to a pair of conventional tongs 120. In addition to, or instead of the grippingly edges 160 or resilient ribs other attachment methods such as adhesive may be used to hold the shield 140 securely on the tongs 120.

In a modified version of the shield (not shown), shield 140 is divided (similar in appearance to that shown in FIGS. 3 and 4), omitting aperture 170, and together with hinge end cover 150 and handle covers 152 and 158, the shield sections 42 are securely held in place as described above.

When attached to tongs 120, shield 140 permits the user to rest the grasping ends 128 of the tongs 120 and the outer edge 144 of shield 140 on a surface without having the tong handle portions 124 touch the surface. Shield 140, by extending substantially 360 degrees around the arms 122, when in the closed position, and extending radially outward a sufficient distance from the arms 122, also deters the user's hand from coming into direct contact with the material being grasped with the tongs 120.

Referring now to FIG. 6A, when the outer edge of the tongs of the present invention is placed directly on the food inside a bowl, the handle portions do not come into contact with the food, and the surface area of the utensil that actually touches the food is minimized, compared to conventional tongs placed inside a bowl. Similarly, FIG. 6B illustrates how the shield of the tongs of the present invention may be rested on the rim of a serving bowl to (entirely avoid contacting the food with the shield. A person who is concerned about maintaining sanitary food handling conditions can readily appreciate the advantages of the tongs of the present invention over conventional serving utensils. The tongs assembly, having a shield with large, flat surface areas prominently situated on the tongs, also lends itself to the advantageous placement of advertising or other indicia.

All patents or publications mentioned in this specification are indicative of th level of skill of those of knowledge in the art to which the invention pertains. All patents and publications referred to in this application are incorporated herein by reference to the same extent as if each was specifically indicated as being incorporated by reference and to the extent that they provide materials and methods not specifically shown.

While the preferred embodiment of the invention has been shown and described, modifications thereof can be made by one skilled in the art without departing from the spirit and teachings of the invention. The embodiment described herein is exemplary only, and is not limiting. Many variations and modifications of the invention and apparatus disclosed herein are possible and are within the scope of the invention. Accordingly, the scope of protection is not limited by the description set out above, but is only limited by the claims which follow, that scope including all equivalents of the subject matter of the claims.

What is claimed is:

1. A tongs assembly comprising:

first and second arms having first and second ends, and a handle portion disposed between said first and second ends, said first ends being pivotably joined together and biased apart toward an open position, and said second ends being mutually opposed when said arms are in a closed position; and a shield fixedly attached to at least one of said arms, said shield extending substantially 360 degrees around said arms when said arms are in said closed position, said shield disposed substantially perpendicular to the longitudinal axis of said arms, and extending outward a distance from said arms such that upon resting said tongs assembly on a substantially flat surface said second ends contact said surface, a portion of said shield contacts said surface, and said first ends are away from said surface.

2. The tongs assembly of claim 1 wherein said shield is made of plastic.

3. The tongs assembly of claim 1 wherein said shield has a configuration chosen from the group consisting of round, oblong, square, rectangular and other regular or irregular configurations with dimensions sufficient to maintain said first ends away from said surface upon resting said tongs assembly on a substantially flat surface.

4. The tongs assembly of claim 1 wherein said shield is substantially planar.

5. The tongs assembly of claim 1 wherein said shield is concave downward toward said second ends.

6. A tongs assembly comprising:

first and second arms having first and second ends, and a handle portion disposed between said first and second ends, said first ends being pivotably joined together and biased apart toward an open position, and said second ends being mutually opposed when said arms are in a closed position; and a substantially planar shield fixedly attached to at least one of said arms adjacent a fulcrum point on said arm, said shield extending substantially 360 degrees around said arms when said arms are in said closed position, said shield disposed substantially perpendicular to the longitudinal axis of said arms, and extending outward a distance from said arms such that upon resting said tongs assembly on a substantially flat surface said second ends contact said surface, a portion of said shield contacts said surface, and a portion of said arms from said fulcrum point to said first ends are away from said surface.

7. The tongs assembly of claim 6 wherein said shield comprises at least two separate sections.

8. The tongs assembly of claim 7 wherein said shield comprises first and second sections with said first section being separate from said second section and attached to said first arm adjacent said fulcrum point and said second section being attached to said second arm adjacent said fulcrum point, each said section having a mutually opposable edge.

9. The tongs assembly of claim 8 wherein said sections and arms are monolithic.

10. The tongs assembly of claim 8 wherein said sections are detachable from said arms.

11. The tongs assembly of claim 8 wherein said sections are substantially semi-circular and engage in said closed position to form a substantially circular shield about said arms.

12. The tongs assembly of claim 7 wherein said tongs assembly includes at least one shield support member fixedly attached to said shield and an arm.

13. The tongs assembly of claim 6 wherein said shield is concave upward toward said first ends.

14. A shield for a tongs with arms, handles and grasping ends, said shield comprising:

a body adapted for attachment to a tongs, said body having at least one generally planar portion which extends outward from a point on an arm of said tongs perpendicularly to the longitudinal axis of said arm when said shield is attached to said tongs;

an attachment portion extending from each said at least one planar portion and adapted for fixed attachment to an arm of the tongs such that when said shield is attached to the tongs and such combination is placed on a substantially flat surface, a part of said at least one planar portion contacts said surface, a grasping end contacts said surface and said handles are away from said surface.

15. The shield of claim 14 wherein said at least one generally planar portion is circular.

16. The shield of claim 14 wherein said at least one generally planar portion includes two mutually opposable semi-circular members.

17. The shield of claim 14 wherein said planar portion and attachment portion are monolithic.

18. The tongs assembly of claim 1 wherein said shield is one piece and includes an aperture adjacent said fulcrum point through which said arms extend.

19. The tongs assembly of claim 18 wherein said shield further includes resilient handle covers disposed on said arms and a resilient hinge end cover disposed on said hinge end.

20. The tongs assembly of claim 19 wherein said handle covers includes a resilient rib or a rolled edge.

21. The shield of claim 14 wherein said shield is one piece comprising a single planar portion.

22. The shield of claim 21 wherein said shield further comprises at least one handle cover.

23. The shield of claim 21 wherein said shield further comprises a hinge end cover.

* * * * *